(12) United States Patent
Guo et al.

(10) Patent No.: US 12,506,530 B2
(45) Date of Patent: Dec. 23, 2025

(54) METHOD AND APPARATUS FOR BEAM FAILURE DETECTION AND RECOVERY IN SIDELINK

(71) Applicant: Lenovo (Beijing) Limited, Beijing (CN)

(72) Inventors: Xin Guo, Chaoyang District (CN); Haipeng Lei, Haidian District (CN); Lianhai Wu, Chaoyang (CN); Zhennian Sun, Chaoyang District (CN); Xiaodong Yu, Haidian District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 311 days.

(21) Appl. No.: 18/042,229

(22) PCT Filed: Aug. 24, 2020

(86) PCT No.: PCT/CN2020/110847
§ 371 (c)(1),
(2) Date: Feb. 20, 2023

(87) PCT Pub. No.: WO2022/040870
PCT Pub. Date: Mar. 3, 2022

(65) Prior Publication Data
US 2023/0328829 A1   Oct. 12, 2023

(51) Int. Cl.
*H04B 7/06* (2006.01)
*H04W 76/19* (2018.01)

(52) U.S. Cl.
CPC ....... *H04B 7/06954* (2023.05); *H04B 7/0621* (2013.01); *H04B 7/06964* (2023.05); *H04W 76/19* (2018.02)

(58) Field of Classification Search
CPC . H04W 76/19; H04B 7/0621; H04B 7/06964; H04B 7/06954
See application file for complete search history.

(56) References Cited

U.S. PATENT DOCUMENTS

| 2019/0173740 A1 | 6/2019 | Zhang et al. |
| 2020/0007678 A1 | 1/2020 | Zhou et al. |

(Continued)

FOREIGN PATENT DOCUMENTS

| CN | 110351112 A | 10/2019 |
| CN | 110392380 A | 10/2019 |

(Continued)

OTHER PUBLICATIONS

PCT/CN2020/110847, "International Preliminary Report on Patentability", PCT Application No. PCT/CN2020/110847, Mar. 9, 2023, 5 pages.

(Continued)

*Primary Examiner* — Harry H Kim
(74) *Attorney, Agent, or Firm* — FIG. 1 Patents

(57) ABSTRACT

Embodiments of the present application relate to a method and apparatus for beam failure detection and recovery in sidelink. An exemplary method includes: obtaining configuration information for a beam failure recovery (BFR) procedure on sidelink, wherein the configuration information indicates a periodic window: performing a reception of at least one transmission of a beam failure detection reference signal (BFD-RS) on the sidelink within the periodic window according to the configuration information. Embodiments of the present application can efficiently reduce delay as well as signalling overhead for BFR in sidelink.

20 Claims, 7 Drawing Sheets

(56) References Cited

U.S. PATENT DOCUMENTS

| | | | |
|---|---|---|---|
| 2020/0153542 A1* | 5/2020 | Zhou | H04B 7/06964 |
| 2021/0234601 A1* | 7/2021 | Awadin | H04W 74/0808 |
| 2022/0399927 A1 | 12/2022 | Tsai et al. | |
| 2023/0032007 A1* | 2/2023 | Ali | H04B 7/0639 |
| 2023/0189373 A1* | 6/2023 | Matsumura | H04W 76/19 370/329 |
| 2023/0232426 A1* | 7/2023 | Liu | H04B 7/0621 370/330 |

FOREIGN PATENT DOCUMENTS

| | | | |
|---|---|---|---|
| CN | 110637496 A | 12/2019 | |
| CN | 110933725 A | 3/2020 | |
| CN | 111083942 A | 4/2020 | |
| CN | 111418249 A | 7/2020 | |
| WO | 2020033088 A1 | 2/2020 | |
| WO | WO-2020030162 A1 * | 2/2020 | H04W 72/046 |
| WO | 2020056180 A1 | 3/2020 | |
| WO | 2020063228 A1 | 4/2020 | |
| WO | 2020145497 A1 | 7/2020 | |
| WO | 2020149640 A1 | 7/2020 | |
| WO | 2020167773 A1 | 8/2020 | |

OTHER PUBLICATIONS

PCT/CN2020/110847, "International Search Report and Written Opinion", PCT Application No. PCT/CN2020/110847, May 20, 2021, 6 pages.

20950545.2, "European Search Report", Application No. 20950545.2, Apr. 23, 2024, 14 pages.

20950545.2, "Extended European Search Report", EP Application No. 20950545.2, Jul. 15, 2024, 11 pages.

Interdigital Inc., "RLM/RLF for NR V2X", 3GPP RAN WG2 Meeting #107bis R2-1912874 (R16 V2X WI A645 RLM_RLF), 3rd Generation Partnership Project (3GPP), Mobile Competence Centre ; 650,, Oct. 14, 2019, 4 pages.

Samsung, "Considerations for Sidelink CSI", 3GPP TSG RAN WG1 #96 Mobile Competence Centre ; 650, Route Des Lucioles ; F-06921 Sophia-Antipolis Cedex ; FRANCE, Feb. 25, 2019, 6 pages.

SAMSUNG, "Considerations on Sidelink CSI", 3GPP TSG RAN WG1 #96, R1-1902279, Athens, Greece, Feb. 2019, 6 pages.

Vivo, "NR sidelink synchronization mechanism", 3GPP TSG RAN WG1 Meeting #94bis, R1-1810390, Chengdu, China, Oct. 2018, 5 pages.

"Foreign Office Action", CN Application No. 202080103409.X, Apr. 10, 2025, 9 pages.

202080103409.X, "Foreign Office Action", CN Application No. 202080103409.X, Dec. 2, 2024, 13 pages.

2023-513391, "Decision to Grant", JP Application No. 2023-513391, Oct. 6, 2024, 6 pages.

2023513391, "Foreign Office Action", JP Application No. 2023513391, Jun. 21, 2024, 6 pages.

* cited by examiner

METHOD AND APPARATUS FOR BEAM FAILURE DETECTION AND RECOVERY IN SIDELINK

TECHNICAL FIELD

Embodiments of the present application generally relate to wireless communication technology, especially to a method and apparatus for beam failure detection and recovery in sidelink.

BACKGROUND

To meet the ever increasing quality of service (QOS) requirements for sidelink communications, operating in the millimeter wave (i.e., mmWave) frequency band or even terahertz (i.e., THz) frequency band becomes a promising solution, because such frequency bands are expected to provide high capacity and support connections of high data rate as well as delay-sensitive data exchange.

Although mmWave/THz communication is very attractive from the data throughput perspective, it creates challenges for the physical layer. For example, due to the high propagation loss, the use of mmWave/THz frequency bands is deemed suitable for mainly short range (e.g., a few hundred meters) and point-to-point line of sight (LoS) communications. To maintain the desired communication range, operating in mmWave/THz frequency bands is assumed to use directional antenna systems to compensate the high propagation loss.

Hence, the industry desires an improved technology for efficient beam management (e.g., beam failure detection and beam failure recovery) in sidelink systems, especially for the sidelink systems operating in mmWave/THz frequency bands.

SUMMARY OF THE APPLICATION

Some embodiments of the present application at least provide a technical solution for beam failure detection and recovery in sidelink.

According to some embodiments of the present application, a method may include: obtaining configuration information for a beam failure recovery (BFR) procedure on sidelink, wherein the configuration information indicates a periodic window; performing a reception of at least one transmission of a beam failure detection reference signal (BFD-RS) on the sidelink within the periodic window according to the configuration information.

According to some other embodiments of the present application, a method may include: obtaining configuration information for a BFR procedure on sidelink, wherein the configuration information indicates a periodic window; and transmitting at least one transmission of a BFD-RS on the sidelink within the periodic window according to the configuration information.

According to some other embodiments of the present application, a method may include: transmitting configuration information for a BFR procedure on sidelink, wherein the configuration information indicates a periodic window, wherein at least one transmission of the BFD-RS is within the periodic window according to the configuration information.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for beam failure detection and recovery in sidelink, which can reduce delay as well as signalling overhead for BFR in sidelink.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
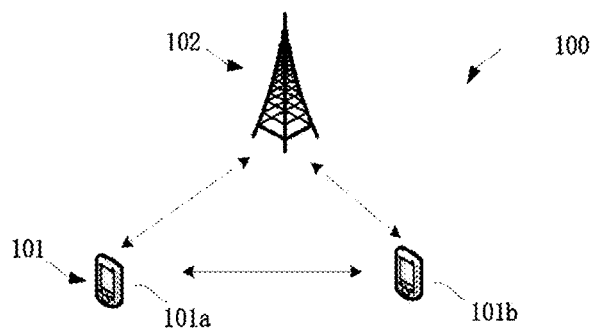
FIG. 1 is a schematic diagram illustrating an exemplary wireless communication system 100 according to some embodiments of the present application.

FIG. 1 is a schematic diagram illustrating an exemplary wireless communication system 100 according to an embodiment of the present application.

As shown in FIG. 1, a wireless communication system 100 includes at least one user equipment (UE) 101 and at least one base station (BS) 102. In particular, the wireless communication system 100 includes two UEs 101 (e.g., UE 101a and UE 101b) and one BS 102 for illustrative purpose. Although a specific number of UEs 101 and BS 102 are depicted in FIG. 1, it is contemplated that any number of UEs 101 and BSs 102 may be included in the wireless communication system 100.

According to some embodiments of the present application, the UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

According to some embodiments of the present application, the UE(s) 101 may include vehicle UEs (V-UEs), vulnerable road user (VRUs), public safety UEs (PS-UEs), and/or commercial sidelink UEs (CS-UEs). In an embodiment of the present application, a VRU may include a pedestrian UE (P-UE), a cyclist UE, a wheelchair UE or other UEs which requires power saving compared with a V-UE. According to some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BS(s) 102 via LTE or NR Uu interface.

According to some embodiments of FIG. 1, the UE 101a functions as transmitting (Tx) UE, and UE 101b functions as receiving (Rx) UE. UE 101a may exchange V2X messages with UE 101b through a sidelink, for example, PC5 interface as defined in 3GPP TS 23.303. UE 101a may transmit information or data to other UE(s) within the V2X communication system, through sidelink unicast, sidelink groupcast, or sidelink broadcast. For instance, UE 101a transmits data to UE 101b in a sidelink unicast session. UE 101a may transmit data to UE 101b and other UEs in a groupcast group (not shown in FIG. 1) by a sidelink groupcast transmission session. Also, UE 101a may transmit data to UE 101b and other UEs (not shown in FIG. 1) by a sidelink broadcast transmission session. Alternatively, according to some other embodiments of FIG. 1. UE 101b functions as Tx UE and transmits V2X messages, UE 101a functions as Rx UE and receives the V2X messages from UE 101b.

Both UE 101a and UE 101b in the embodiments of FIG. 1 may transmit information to BS 102 and receive control information from BS 102, for example, via LTE or NR Uu interface. BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, where BS(s) 102 transmit data using an OFDM modulation scheme on the downlink (DL) and the UE(s) 101 transmit data on the uplink (UL) or sidelink (SL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

In the case of beam-based communication between a BS 102 and a UE 101, sudden changes in the radio environment may degrade or even interrupt the communication link between the BS 102 and the UE 101, i.e. Uu link. The use of narrow beams will further intensify the quality degradation of link due to blockage. When a beam failure in Uu link occurs, a BFR procedure may be used for the Uu link to recover from connectivity interruption.

For Uu link, the BFR procedure may work as follows: (1) UE monitors the quality of the downlink control channels by estimating a set of periodical reference signals and declares beam failure once the perceived quality is not adequate to maintain reliable communication; (2) Then, the UE initiates a recovery to indicate the failure and a new suitable beam to the BS. When beam failure is declared for a particular Uu link, it is not possible for the UE to transmit over that particular Uu link. Therefore, the UE has to initiate a BFR procedure by reusing a random access (RA) procedure.

Both contention-based random access (CBRA) and contention-free random access (CFRA) are supported for the BFR procedure in the Uu link. In the case of the CBRA-based BFR, a contention resolution is needed since multiple users randomly select a preamble from a shared pool of preambles. In the case of the CFRA-based BFR, a dedicated preamble is pre-allocated to each UE, and thus no contention resolution is needed.

The above BFR procedure in the Uu link may be not suitable for the BFR in the sidelink. For example, FIG. 2 is a schematic diagram illustrating a beam failure in sidelink according to some embodiments of the present application.

Figure 2:
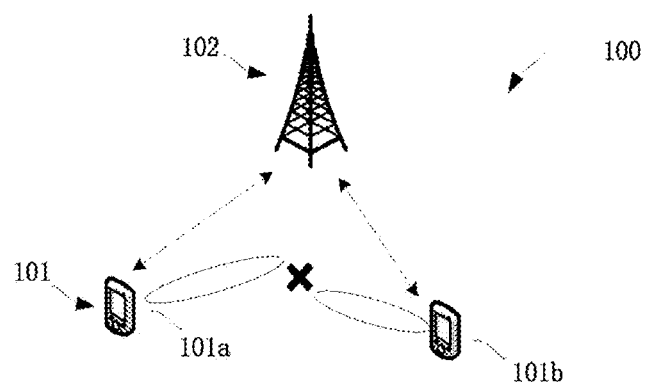
FIG. 2 is a schematic diagram illustrating a beam failure in sidelink according to some embodiments of the present application.

Referring to FIG. 2, the system 100 in FIG. 2 may be the same as that in FIG. 1. The UE 101a and the 101b may use a pair of beams to communication with each other. In some cases, the pair of beams between the UE 101a and the 101b may be blocked. However, the above BFR procedure used in the Uu link may be not suitable for the sidelink. The reasons are as follows.

Firstly, the use of periodic reference signals for beam failure detection in the Uu link results in inefficiency of resource utilization for the case of aperiodic traffics in sidelink, because the transmission pattern of the aperiodic traffics is not predictable. Secondly, the RA-based BFR from a completely interrupted connection causes an intolerable delay for the sidelink traffics which are usually related to a driving safety scenario. Moreover, the CBRA-based BRF requires a contention resolution, which is difficult for sidelink communication, especially in mode 2 as specified in 3GPP standard documents, where a UE autonomously selects resource for sidelink communication. The CFRA-based BFR does not require the contention resolution but requires a large number of preambles to enable multiple pairs of UEs in communicating over sidelink simultaneously in given area.

Given the above, it is challenging for the BFR mechanism in Uu link to be applied in sidelink scenario due to the introduced intolerable delay, the high signaling overhead, the inefficient resource utilization and the complicated contention resolution.

Accordingly, embodiments of the present application provide a technical solution for beam failure detection and recovery in sidelink, which can reduce delay as well as signalling overhead for BFR in sidelink. More details on embodiments of the present application will be illustrated in the following text in combination with the appended drawings.

According to some embodiments of the present application, a UE (e.g., a Tx UE or an Rx UE) may obtain configuration information for a BFR procedure on sidelink. The configuration information may include a configuration for BFD-RS transmission and a configuration for BFD report. The BFD-RS in sidelink may also be referred to as SL BFD-RS. The SL BFD-RS may be used for beam failure detection in Sidelink (i.e., SL BFD), which is performed by evaluating the quality of SL BFD-RS. The step of obtaining configuration information may be the step 301 in FIG. 3 or the step 401 in FIG. 4

Figure 3:
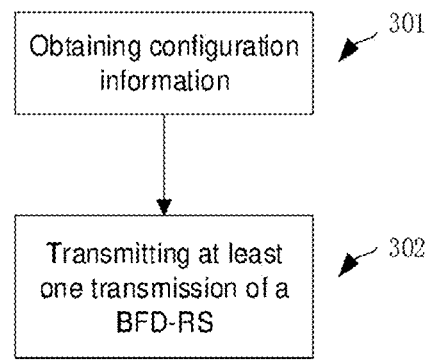
FIG. 3 is a flow chart illustrating a method for beam failure detection and recovery in sidelink according to some embodiments of the present application.
Figure 4:
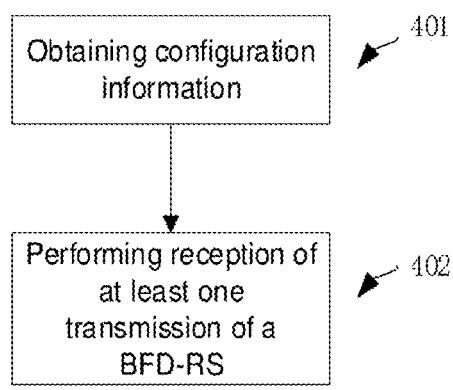
FIG. 4 is a flow chart illustrating a method for beam failure detection and recovery in sidelink according to some other embodiments of the present application.

For example, FIG. 3 is a flow chart illustrating a method for beam failure detection and recovery in sidelink according to some embodiments of the present application. The method in FIG. 3 may be performed by a Tx UE (e.g., UE 101a). FIG. 4 is a flow chart illustrating a method for beam failure detection and recovery in sidelink according to some other embodiments of the present application. The method in FIG. 4 may be performed by an Rx UE (e.g., UE 101b).

According to some embodiments of the present application, obtaining the configuration information may include receiving the configuration information transmitted from the BS 102. In an embodiment of the present application, the configuration information may be transmitted via a radio resource control (RRC) signaling. That is, a UE (e.g., a Tx UE or an Rx UE) may receive configuration information through an RRC signaling transmitted from the BS 102.

According to some other embodiments of the present application, the configuration information may be preconfigured in a UE (e.g., a Tx UE or an Rx UE), for example, in a subscriber identity module (SIM), in a universal subscriber identity module (USIM), or in a memory of the UE. Therefore, obtaining configuration information may refer to access the SIM, USIM or the memory for acquiring the configuration information inside the UE.

According to some embodiments of the present application, obtaining the configuration information may include receiving the configuration information via an RRC signaling transmitted from another UE different from the UE.

According to some embodiments of the present application, the configuration for BFD-RS transmission included in the configuration information may indicate a periodic window. The periodic window for BFD-RS transmission may be semi-statically configured such that the resource of SL BFD-RS is transmitted within the period window according to the configuration information subject to the availability of the transmission. In an embodiment of the present application, the configuration for the BFD-RS transmission may indicate at least one of: a timing type of the BFD-RS, wherein the timing type is one of pseudo-periodic and pseudo-semi-persistent; a RS type of the BFD-RS, wherein the RS type is one of a synchronization signal and physical broadcast channel (PBCH) block (SSB) and a channel state information (CSI) reference signal (CSI-RS); a length of the periodic window; a minimum number of transmissions within each window of the periodic window; a maximum number of transmissions within each window of the periodic window; and an offset for a first window of the periodic window.

In an embodiment of the present application, a pseudo-periodic timing type or a pseudo-semi-persistent timing type may mean that the window for transmitting the BFD-RS is periodic but the resource within the window for transmitting the BFD-RS is not fixed. Correspondingly, the CSI-RS (or SSB) used as the BFD-RS may also be referred to as the pseudo-periodic CSI-RS (or SSB) or the pseudo-semi-persistent CSI-RS (or SSB).

While the configuration information for the pseudo-periodic BFD-RS and the pseudo-semi-persistent BFD-RS may be the same, the difference between the two types is that when the configuration information is deemed to be effective by the UE. For example, for the pseudo-periodic BFD-RS, once the configuration information is received by the UE, the UE may assume that it is effective. That is, the UE may assume that the BFD-RS is transmitted based on the configuration information once the configuration information is received by the UE. In contrast, for the pseudo-semi-persistent BFD-RS, after receiving the configuration information, the UE may not assume that the BFD-RS is transmitted based on the configuration information until the configuration is activated. In the case of the Tx UE, the configuration can be activated by receiving an explicit activation message, such as a medium access control (MAC) control element (CE) message or downlink control information (DCI), from the BS. Alternatively, the Tx UE can determine to activate the configuration and transmit an explicit activation message, such as a MAC CE or sidelink control information (SCI), to the Rx UE. In the case of the Rx UE, the configuration can be activated by receiving an explicit activation message, such as a MAC CE message or DCI, from the BS. Alternatively, the configuration can be activated by receiving a MAC CE message or SCI from the Tx UE.

In an embodiment of the present application, a length of the periodic window may be defined as a parameter N, wherein N is a positive integer. The unit of N may be a slot, a millisecond, a mini-slot, or a symbol and so on. For example, N may be expressed in slots and one of the following values N∈{4, 5, 8, 10, 16, 20, 32, 40, 64, 80, 160, 320, 640} indicated in the configuration information.

In an embodiment of the present application, the offset for a first window of the periodic window may be defined as a parameter O, wherein O∈{0, 1, . . . , N−1}. The unit of the parameter O may be the same as that of the parameter N. The reference point for the offset may be with respect to the first slot (i.e., slot #0) of first radio frame (i.e., radio frame #0 or RF #0). Alternatively, the reference point for the offset may be with respect to the time receiving an explicit activation message, such as a MAC CE message, DCI or SCI.

In an embodiment of the present application, the timing type of the BFD-RS may be indicated by a resourceType information element (IE). The RS type may be indicated by a new sl-BFD-RS-Type IE. The length of the periodic window may be indicated by a new sl-BFD-RS-LengthOfWindow IE. The minimum number of transmissions within each window may be indicated by a new sl-BFD-RS-MinNumOfTxPerWindow IE. The maximum number of transmissions within each window may be indicated by a new sl-BFD-RS-MaxNumOfTxPerWindow IE. The offset for the first window of the periodic window may be indicated by a new sl-BFD-RS-Offset IE.

For example, the following table 1 shows the IEs for sidelink (SL) BFD-RS which should be amended or added to 3GPP standard documents.

TABLE 1

| IEs for SL BFD-RS |
|---|
| resourceType of the sl-BFD-RS |
| Indicates timing type of the BFD-RS is one of aperiodic, semiPersistent, periodic, pseudo-periodic and pseudo-semi-persistent. |
| sl-BFD-RS-Type |
| Indicates the RS type to be the SSB or the CSI-RS. |
| sl-BFD-RS-LengthOfWindow |
| Indicates the length (expressed such as in slots, milliseconds, mini-slots, or symbols) of each window of the periodic window for BFD-RS transmission. |
| sl-BFD-RS-MinNumOfTxPerWindow |
| Indicates the minimum number of transmissions for SL BFD-RS within each window of the periodic window. The default value for this parameter can be set to 1. That is, the resource of SL BFD-RS is transmitted at least once within each window subject to the availability of its transmission. |
| sl-BFD-RS-MaxNumOfTxPerWindow |
| Indicates the maximum number of transmissions for SL BFD-RS within each window of the periodic window. |
| sl-BFD-RS-Offset |
| Indicates the offset (in number of slots, milliseconds, mini-slots, or symbols) for the first window of the periodic window. |

After receiving the configuration for BFD-RS transmission, at step 302, the Tx UE (e.g., UE 101a) may transmit at least one transmission of a BFD-RS on the sidelink within the periodic window according to the configuration information.

In some embodiments of the present application, the transmitting may be subject to an availability of resource(s) for the at least one transmission of the BFD-RS in the periodic window. For example, the periodic window may include a sequence of windows having the same periodicity or window length. In each window of the periodic window, whether the Tx UE will transmit the at least one transmission of the BFD-RS is subject to an availability of resource(s) for the at least one transmission of the BFD-RS in each window of the periodic window. The resource(s) for the transmission of the BFD-RS can be obtained by at least one of: being autonomously selected by the Tx UE, being scheduled by the BS, and being determined and indicated by a UE other than the Tx UE.

After receiving the configuration for BFD-RS transmission, at step 402, the Rx UE may perform a reception of at least one transmission of a BFD-RS on the sidelink within the periodic window according to the configuration information. The at least one transmission of the BFD-RS within the periodic window may be transmitted by a Tx UE (e.g., UE 101a).

In some embodiments of the present application, performing a reception of at least one transmission in the periodic window may refer to trying to receive the at least one transmission in the periodic window. However, due to some reasons (for example, the Tx UE does not transmit the transmission of the BFD-RS in a certain window of the periodic window or the signal quality between the Tx UE and the Rx is not good enough in a certain window of the periodic window), the Rx UE may not receive the at least one transmission in a certain window of the periodic window.

Figure 5:
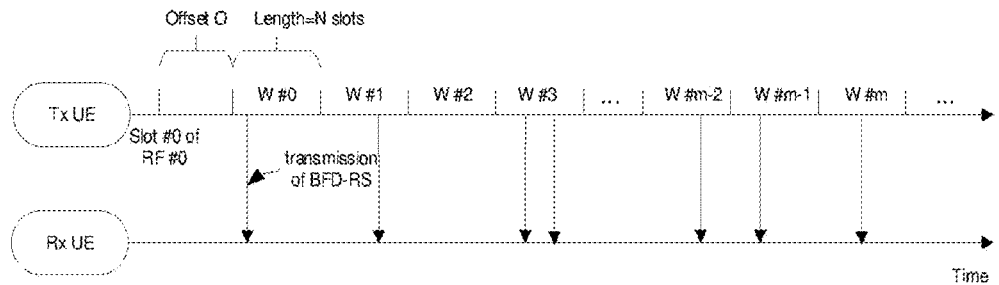
FIG. 5 illustrates an example of BFD-RS transmission in the time domain according to some embodiments of the present application.

FIG. 5 illustrates an example of BFD-RS transmission in the time domain according to some embodiments of the present application.

Referring to FIG. 5, the periodic window for BFD-RS transmission can be denoted by W #0, W #1, W #2, . . . , and W #m, wherein m is a positive integer. Each window may have a window length of N slots. The offset of the first window from slot #0 of radio frame #0 is an offset O. Within each window, the number of transmissions of BFD-RS may be larger than or equal to the minimum number of transmissions and less than or equal to the maximum number of transmissions indicated in the configuration information. However, whether the BFD-RS can be transmitted within a window may be subject to the availability of resources for the BFD-RS transmission within the window.

Referring to FIG. 5, the Tx UE may transmit one transmission of BFD-RS within W #0, W #1, W #m−2, W #m−1, and W #m since the minimum number of transmissions for SL BFD-RS within each window of the periodic window is set as 1. For W #2, since there is no available resource can be used for BFD-RS transmission, no BFD-RS is transmitted within W #2. The BFD-RS is transmitted twice by the Tx UE within W #3 since the maximum number of transmissions for SL BFD-RS within each window of the periodic window is set as 2. In an embodiment of the present application, the reason for BFD-RS to be transmitted twice within a window may be that the feedback from the Rx UE indicates an unsuccessful reception of the first transmission of the BFD-RS.

The Rx UE may perform a reception of the at least one transmission of the BFD-RS within each window of the periodic window. However, perform a reception of the at least one transmission does not mean receiving the at least one transmission. For example, within W #2, the Rx UE may monitor the resource and try to receive the at least one transmission of the BFD-RS. However, since the Tx UE does not transmit the BFD-RS within W #2, the Rx UE may not receive any transmission of the BFD-RS. In another example, although the Tx UE may transmit at least one transmission of the BFD-RS within a window, the Rx UE may still not receive any transmission of the BFD-RS because the channel quality between the Tx UE and the Rx UE may be not good enough.

The periodic window in FIG. 5 is illustrated as distributing continuously in the time domain. According to some embodiments of the present application, such a distribution can be regarded as a logical distribution of the periodic window. In practice, the physical distribution of periodic window can be discontinuous subject to a distribution of resource pool in the time domain. In addition, the discontinuous reception (DRX) can be supported according to some embodiments of the present application. In these embodiments, a length and distribution of on-duration for the DRX may be further defined within each window of the period window. The transmitting/receiving of BFD-RS and transmitting/receiving of BFD report are carried out during the DRX on-duration.

Figure 6:
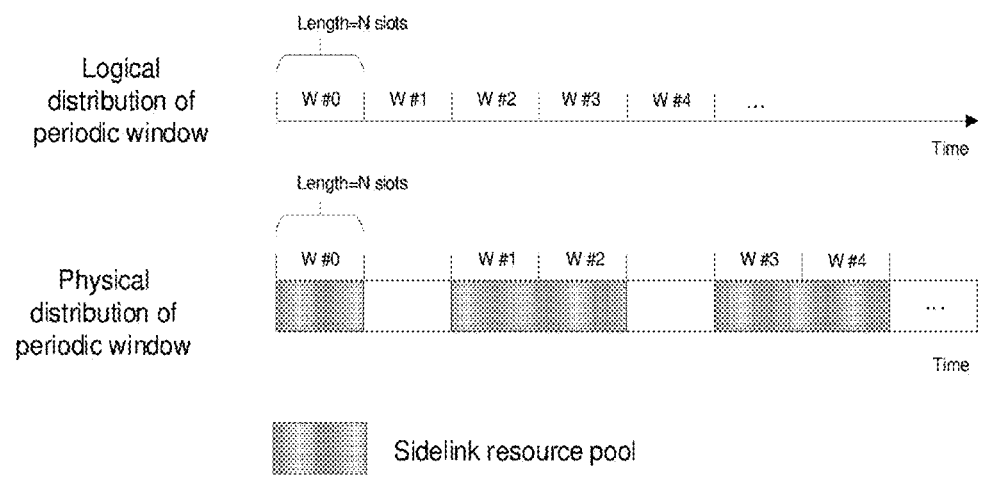
FIG. 6 illustrates another example of BFD-RS transmission in the time domain according to some other embodiments of the present application.
Figure 7:
FIG. 7 illustrates another example of BFD-RS transmission in the time domain according to some other embodiments of the present application.

For example, FIG. 6 illustrates another example of BFD-RS transmission in the time domain according to some other embodiments of the present application. In the example of FIG. 6, the logical distribution of the periodic window may be continuous, whereas the physical distribution of the periodic window may be discontinuous subject to the distribution of resource pool in the time domain. In addition, FIG. 7 illustrates another example of BFD-RS transmission in the time domain according to some other embodiments of the present application. In the example of FIG. 7, each window of the periodic window may include a DRX on-duration time period and a DRX off-duration time period. The on-duration time period may have a length. The transmitting/receiving of BFD-RS and transmitting/receiving of BFD report are carried out during the DRX on-duration time period.

According to some embodiments of the present application, the BFD-RS is conveyed in a physical sidelink shared channel (PSSCH) transmission.

In an embodiment of the present application, each transmission of the BFD-RS within the periodic window refers to transmitting a set of BFD-RS in one PSSCH transmission. The set of the BFD-RS may include at least one BFD-RS.

In an embodiment of the present application, the Tx UE may transmit an indicator in SCI associated with the PSSCH transmission to the Rx UE. The indicator may indicate a presence of the BFD-RS in the PSSCH transmission. For the Rx UE, before receiving the PSSCH transmission, the Rx UE may first receive an indicator in the SCI associated with the PSSCH transmission from the Tx UE. In response to receiving the indicator, the Rx UE may assume that the PSSCH transmission includes the BFD-RS. In response to not receiving the indicator, the Rx UE may assume that the PSSCH transmission does not include the BFD-RS.

In another embodiment of the present application, the BFD-RS may be transmitted in the PSSCH transmission in response to that all of the following three conditions are satisfied: (1) the corresponding PSSCH is transmitted by the UE; (2) a SL BFD reporting is enabled by higher layer signaling; and (3) the corresponding SCI indicates the presence of the BFD-RS.

According to some embodiments of the present application, the resource in the frequency domain for transmitting the BFD-RS may be defined by a group of sidelink physical resource blocks containing the sidelink BFD-RS to which the derived BFD report relates.

According to some embodiments of the present application, the configuration information may be transmitted in frequency range 1 (FR1) as specified in 3GPP standard documents. The BFD-RS may be transmitted in FR2 as specified in 3GPP standard documents.

For the Rx UE, after receiving the at least one transmission of the BFD-RS within the periodic window, the Rx UE performs measurement and may report the BFD report according to the configuration for BFD report included in the configuration information. The BFD report may be determined based on the BFD-RS.

Correspondingly, for the Tx UE, after transmitting the at least one transmission of the BFD-RS within the periodic window, the Tx UE may receive the BFD report according to the configuration for BFD report included in the configuration information.

The configuration for BFD report may indicate a reporting criterion. The reporting criterion may be one of a pseudo periodic reporting, a pseudo-semi-persistent reporting and an event triggered reporting.

According to some embodiments of the present application, in response to that the reporting criterion is the pseudo periodic reporting or a pseudo-semi-persistent reporting, the configuration for BFD report further indicates at least one of: a timing type of a BFD report; a periodicity for the BFD report; a reporting window for the BFD report; a quantity for the BFD report; and a maximum number of a counter used for unsuccessful receiving of the BFD report.

In embodiments of the present application, the timing type of the BFD report may be one of pseudo-periodic and pseudo-semi-persistent. The pseudo-periodic and pseudo-semi-persistent may refer to that the reporting window for the BFD report is periodic while the resource for the BFD report within each window is not fixed. The resource for the BFD report within each window can be determined by the Rx UE. In the case that the timing type of BFD report is pseudo-semi-persistent, the activation or deactivation of the configuration for the BFD report is determined based on the activation or deactivation of the configuration for the BFD-RS transmission. For example, in response to the activation of the configuration for the BFD-RS transmission, the configuration for the BFD report is activated. In response to the deactivation of the configuration for the BFD-RS transmission, the configuration for the BFD report is deactivated.

In an embodiment of the present disclosure, the periodicity is an integer multiple of a length of the periodic window for BFD-RS transmission. For example, the integer may be defined by a parameter m, wherein m is a positive integer. That is, the BFD report may be triggered every m windows for BFD-RS transmission.

In another embodiment of the present disclosure, the reporting window may be defined by a start point and an end point.

The reporting window may have a start point defined by one of the following: a start point of the number k*m−1 window of the periodic window; a start point of the number k*m window of the periodic window; and a time receiving the BRD-RS in the number k*m−1 window of the periodic window, wherein k is a positive integer and k*m represents k multiplied by m.

The reporting window may have an end point defined by one of the following: an end point of the number k*m−1 window of the periodic window; an end point of the number k*m window of the periodic window; and a duration of the reporting window indicated in the configuration information, wherein k is a positive integer. In an embodiment of the present application, the duration of the reporting window may be indicated by a sl-LatencyBound-CSI-Report IE as specified in 3GPP standard.

A start point may be combined with an end point or the duration to determine the reporting window. For example, the reporting window may have a start point of the number k*m−1 window as the start point and have an end point of the number k*m−1 window as the end point. In this example, the length of the reporting window may be the length of each window of the periodic window.

In an embodiment of the present application, the report quantity may include at least one of: a first indicator indicating whether a beam pair is reliable for sidelink transmission; a channel quality indicator (CQI); a rank indication (RI); a precoding matrix indicator (PMI); and a reference signal received power (RSRP).

In an embodiment of the present application, the timing type of the BFD report may be indicated by a new timing-Type of the sl-BFD-report IE. The periodicity for the BFD report may be indicated by a new sl-BFD-Report-Periodicity IE. The reporting window for the BFD report may be indicated by a new sl-BFD-Report-Window IE. The quantity for the BFD report may be indicated by a new sl-BFD-Report-Quantity IE.

For example, the following table 2 shows the IEs for pseudo periodic reporting or pseudo-semi-persistent reporting which should be added to 3GPP standard documents.

TABLE 2

IEs for SL periodic reporting or pseudo-semi-persistent reporting timingType of the sl-BFD-report
Indicates timing type of the BFD report is one of pseudo-periodic and pseudo-semi-persistent.
sl-BFD-Report-Periodicity
Indicates periodicity (in number of windows for BFD-RS transmission) for pseudo periodic report or pseudo-semi-persistent.
sl-BFD-Report-Window
Indicates how to define a window for pseudo periodic report or pseudo-semi-persistent transmission. The window can be further defined by an indication of a start point and an indication of an end point or duration for the window.
sl-BFD-Report-Quantity
Indicates a certain number of limited combinations of BFD parameters to be reported.

In an embodiment of the present application, in response to a non-reliable sidelink transmission indicated by the BFD report, the Rx UE may transmit an indication to initiate a beam reselection procedure to the Tx UE. After that, a beam reselection procedure may be carried out between the Tx UE and the Rx UE.

After receiving the configuration of BFD report indicating the reporting window, the Rx UE may transmit the BFD report in the reporting window based on the configuration information. In an embodiment of the present application, the BFD report may be transmitted via at least one of a MAC CE message and SCI. The resource(s) for the transmission of the BFD report can be obtained by at least one of: being autonomously selected by the Rx UE, being scheduled by the BS, and being determined and indicated by a UE other than the Rx UE.

After receiving the configuration of BFD report indicating the reporting window, the Tx UE may receive the BFD report in the reporting window based on the configuration information.

Figure 8:
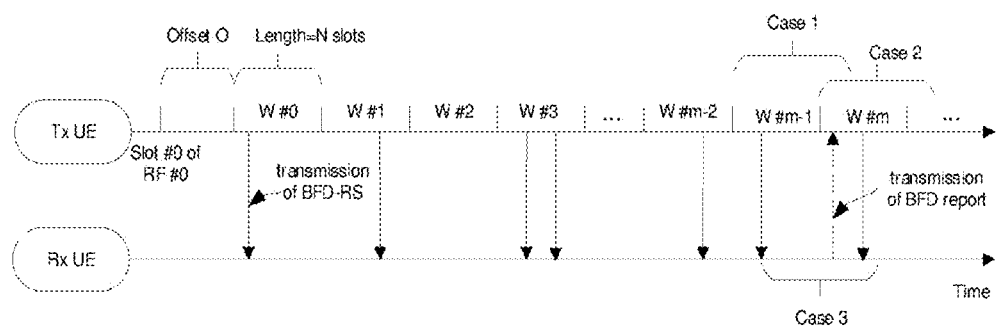
FIG. 8 illustrates an example of BFD report in the time domain according to some embodiments of the present application.

FIG. 8 illustrates an example of BFD report in the time domain according to some embodiments of the present application.

Referring to FIG. 8, the configuration for the periodic window for BFD-RS transmission may be the same as FIG. 5. That is, the periodic window can be denoted by W #0, W #1, W #2, . . . , and W #m, wherein m is a positive integer. Each window may have a window length of N slots. The offset of the first window from slot #0 of radio frame #0 is an offset O.

The Tx UE may transmit one transmission of BFD-RS within W #0, W #1, W #m−2, W #m−1, and W #m. For W #2, since there is no available resource can be used for BFD-RS transmission, no BFD-RS is transmitted within W #2. For W #3, the BFD-RS is transmitted twice by the Tx within W #3.

In the example of FIG. 8, the BFD report may be triggered every m windows. According to the above examples, the reporting window may have one of the following start points: a start point of the number k*m−1 window of the periodic window; a start point of the number k*m window of the periodic window; and a time receiving the BFD-RS in the number k*m−1 window of the periodic window, wherein k is a positive integer.

For simplicity, the example of FIG. 8 merely shown a case where k=1. That is, as shown in FIG. 8, case 1 shows that the reporting window may use a start point of the window W #m−1 as a start point of the reporting window. Case 2 shows that the reporting window may use a start point of the window W #m as a start point of the reporting window. Case 3 shows that the reporting window may use a time receiving the BFD-RS in the window W #m−1 as a start point of the reporting window. The length of the reporting window for the three cases may be the same.

As shown in FIG. 8, the Rx UE may transmit the BFD report to the Tx UE within the reporting window of Case 3. Although FIG. 5 shows that the BFD report is transmitted in a reporting window determined based on window W #m−1, persons skilled in the art can understand that the BFD report may be transmitted every m windows, i.e., transmitted in a periodic reporting window determined based on window W #k*m−1.

The pseudo periodic or the pseudo-semi-persistent BFD report may be used for initiating a beam failure recovery procedure.

For the Rx UE, initiating a beam failure recovery procedure may include the following four steps.

Step 1: the Rx UE may first initiate a counter for unsuccessful receiving of the BFD report to zero.

Step 2: when a reporting window is triggered, the Rx UE may try to transmit the BFD report in a reporting window.

Step 3: In response to transmitting the BFD report in the reporting window, the Rx UE may try to receive a second indicator indicating whether the BFD report is received successfully. In an embodiment of the present application, the indicator may be transmitted together with the BFD-RS transmission within the next window for the BFD-RS transmission neighboring to the reporting window. In another embodiment of the present application, the indicator may be an acknowledgement (ACK) indicator or a non-acknowledgement (NACK) indicator.

In response to a successful receiving of the BFD report indicated by the second indicator, the Rx UE may perform step 4, i.e., perform the BFD-RS receiving and measurement as normal.

In response to an unsuccessful receiving of the BFD report indicated by the second indicator, the Rx UE may increase the counter by 1. In response to that the maximum number of the counter is reached, the Rx UE may trigger a beam failure recovery window and transmit an indication for initiating a beam failure recovery procedure to the Tx UE. In an embodiment of the present application, the indication for initiating the beam failure recovery procedure may be transmitted in FR1 as specified in 3GPP standard documents. Otherwise, the Rx UE may trigger a new reporting window and go back to step 2.

Step 4: the Rx UE performs the BFD-RS receiving and measurement as normal.

For a Tx UE, initiating a beam failure recovery procedure may include the following four steps.

Step 1: the Tx UE may first initiate the counter for unsuccessful receiving of the BFD report to zero.

Step 2: when a reporting window is triggered, the Tx UE may try to receive the BFD report in a reporting window.

Step 3: In response to an unsuccessful receiving or successful receiving of the BFD report in the reporting window, the Tx UE may transmit a second indicator indicating whether the BFD report is received successfully. In an embodiment of the present application, the indicator may be transmitted together with the BFD-RS transmission within the next window for the BFD-RS transmission neighboring to the reporting window. In another embodiment of the present application, the indicator may be an ACK indicator or a NACK indicator.

In response to a successful receiving of the BFD report indicated by the second indicator, the Tx UE may perform step 4, i.e., perform the BFD-RS transmitting as normal.

In response to an unsuccessful receiving of the BFD report indicated by the second indicator, the Tx UE may increase the counter by 1. In response to that the maximum number of the counter is reached, the Tx UE may trigger a beam failure recovery window and receive an indication for initiating a beam failure recovery procedure from the Rx UE. In an embodiment of the present application, the indication for initiating the beam failure recovery procedure may be received in FR1. Otherwise, the Tx UE may trigger a new reporting window and go back to step 2.

Step 4: the Tx UE performs the BFD-RS transmitting as normal.

Figure 9:
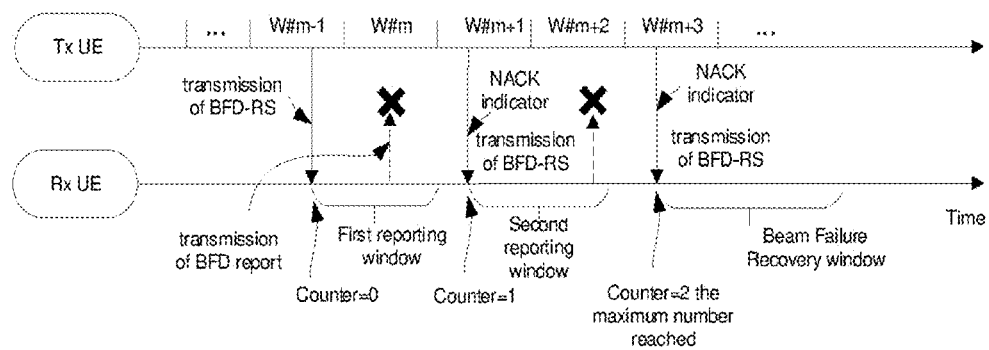
FIG. 9 illustrates an example of initiating a beam failure recovery procedure according to some embodiments of the present application initiating a beam failure recovery procedure.

FIG. 9 illustrates an example of initiating a beam failure recovery procedure according to some embodiments of the present application.

Referring to FIG. 9, the periodic window can be denoted by W #0, . . . , W #m−1, W #m. W #m+1, W #m+2, and W #m+3, wherein m is a positive integer. The Rx UE may perform a reception of the at least one transmission of the BFD-RS within each window of the periodic window.

The reporting window in FIG. 9 may use a time of receiving the BFD-RD transmission as a start point and has a fixed duration. For example, the first reporting window starts from a time receiving the BFD-RD transmission in W #m−1. The first reporting window may have a fixed duration such that the end point of the first reporting window is within the window W #m. The counter used for unsuccessful receiving of the BFD report is set to zero. In the first reporting window, the Rx UE may transmit the BFD report to the Tx UE. If the BFD report is not successfully received by the Tx UE, at the next window neighboring to the first reporting window (i.e., W #m+1), the Tx UE may transmit a NACK indicator indicating the unsuccessful receiving of the BFD report. The NACK indicator may be transmitted together with the BFD-RS transmission, which triggers the second reporting window. That is, the second reporting window starts from a time receiving the BFD-RD transmission in W #m+1. The second reporting window may have a fixed duration such that the end point of the second reporting window is within the window W #m+2. The counter used for unsuccessful receiving of the BFD report is increased by 1 and equals to 1.

In the second reporting window, the Rx UE may transmit the BFD report to the Tx UE. If the BFD report is not successfully received by the Tx UE, at the next window neighboring to the second reporting window (i.e., W #m+3), the Tx UE may transmit a NACK indicator indicating the unsuccessful receiving of the BFD report. The NACK indicator may be transmitted together with the BFD-RS transmission.

In the example of FIG. 9, the maximum number of the counter used for unsuccessful receiving of the BFD report may be 2. Therefore, after receiving the NACK indicator in the W #m+3, the counter used for unsuccessful receiving of the BFD report is increased by 1 and equals to 2. Thus, the Rx UE may trigger a beam failure recovery window and transmit an indication for initiating a beam failure recovery procedure to the Tx UE.

According to some other embodiments of the present application, in response to that the reporting criterion indicated by the configuration for BFD report is the event triggered reporting, the configuration for reporting may further indicate at least one of: an identity (ID) of the event; a value of a beam failure instance (BFI) timer; a maximum number of BFI indications; and a threshold used for the BFI. In an embodiment of the present application, the threshold may map to 10% block error rate (BLER) of a hypothetical physical sidelink control channel (PSCCH).

In an embodiment of the present application, the value of the BFI timer and the maximum number of the BFI indications are associated with at least one of: a geographical zone, a resource pool, a quality of service (QOS) of traffic in sidelink.

In an embodiment of the present application, the value of the BFI timer may be an integer multiple of a length of the periodic window.

In an embodiment of the present application, the ID of the event may be indicated by a new sl-BFD-Report-EventId IE. The value of the BFI timer (e.g., expressed in the number of windows for BFD-RS transmission) may be indicated by a new sl-BFD-Report-BFITimerInNumOfWindow IE. The maximum number of BFI indications may be indicated by a new sl-BFD-Report-MaxNumOfBFIforBeamReselection IE. The threshold for the BFI may be indicated by a new sl-BFD-Report-ThresholdForBeamReselection IE.

For example, the following table 3 shows the IEs for event triggered reporting which should be added to 3GPP standard documents.

TABLE 3

IEs for event triggered reporting sl-BFD-Report-EventId
Choice of sidelink BFD measurement event triggered reporting criteria.
sl-BFD-Report-BFITimerInNumOfWindow
Indicates value of BFD timer for sidelink in number of windows for BFD-RS transmission.
sl-BFD-Report-MaxNumOfBFIforBeamReselection
Indicates maximum number of BFI indications to make a decision of a beam reselection.
sl-BFD-Report-ThresholdForBeamReselection
Indicates a threshold for BFI indication.

For the Rx UE, after receiving the configuration of BFD report which indicates an event triggered reporting, the Rx UE may implement a BFI timer for sidelink. The BFI timer may be restarted once the BFI counter is increased by 1. In addition, the medium access control (MAC) layer of the Rx UE may implement a BFI counter for sidelink to count the BFI indications.

The Rx UE may first initiate the BFI counter to zero. Within a window of the periodic window, after receiving a transmission which includes a set of BFD-RS, the Rx UE may compare a signal quality of each BFD-RS in the set of BFD-RS associated with the transmission of the BFD-RS to the threshold indicated in the configuration information. In response to that all the signal qualities of the set of BFD-RS are below the threshold, the physical layer may transmit a BFI indication to the MAC layer. According to some embodiments of the present application, a window of the periodic window may include more than one transmission, as long as there is one transmission within the window whose signal quality is greater than the threshold, the Rx UE may not transmit a BFI indication to the MAC layer.

After receiving the BFI indication, the MAC layer of the Rx UE may restart the BFI timer and increase a BFI counter by 1. In an embodiment of the present application, in response to that the BFI timer expires, the UE may reset the BFI counter to zero. In an embodiment of the present application, in response to that the BFI counter reaches the maximum number, the Rx UE may transmit an indication to initiate a beam reselection procedure to the Tx UE.

Figure 10:
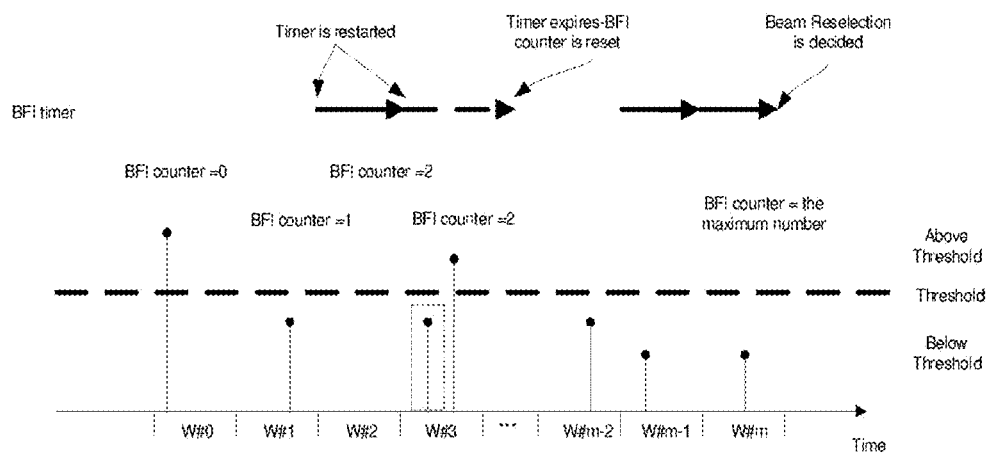
FIG. 10 illustrates an example of detecting an event for a beam reselection procedure according to some embodiments of the present application.

For example, FIG. 10 illustrates an example of detecting an event for a beam reselection procedure according to some embodiments of the present application.

Referring to FIG. 10, the periodic window for BFD-RS transmission can be denoted by W #0, W #1, W #2, . . . , and W #m, wherein m is a positive integer. The value of the BFI timer is equal to 4 windows of the periodic window. Within W #0, there is one transmission including a set of BFD-RS. The Rx may determine that the signal quality of at least one BFD-RS of the set of BFD-RS is above the threshold, and then the BFI counter is maintained to be 0. Within W #1, there is one transmission including a set of BFD-RS, the Rx may determine that all the signal qualities of the set of BFD-RS are below the threshold, and then the BFI counter is increased by 1 and equals to 1 and the BFI timer is restarted. Within W #2, there is no transmission, and thus the Rx may determine that all the signal qualities of the set of BFD-RS are below the threshold, and then the BFI counter is increased by 1 and equals to 2 and the BFI timer is restarted.

Within W #3, there are two transmissions of BFD-RS, each transmission may include a set of BFD-RS. For the first transmission, the Rx may determine that all the signal qualities of the set of BFD-RS are below the threshold. For the second transmission, the Rx may determine that the signal quality of at least one BFD-RS of the set of BFD-RS is above the threshold. Therefore, Within W #3, the BFI counter is not increased by 1 and still equals to 2. For each window, the Rx UE may perform the above operations. Once the BFI timer is expired, the BFI counter is reset to zero. In the example of FIG. 10, Within W #m, the Rx may determine that all the signal qualities of the set of BFD-RS are below the threshold, and then the BFI counter is increased by 1 and may reach the maximum number of BFI indications. In response to the BFI counter reaches the maximum number, the Rx UE may detect an event for a beam reselection procedure, and thus the Rx UE may transmit an indication to initiate a beam reselection procedure.

For the Tx UE, after receiving the configuration of BFD report which indicates an event triggered reporting, the Tx UE may receive an indication to initiate a beam reselection procedure from the Rx UE in the case that the Rx UE detects an event for beam reselection procedure. After that, a beam reselection procedure may be carried out in between the Tx UE and Rx UE. The specific procedure may be illustrated in FIG. 11.

Figure 11:
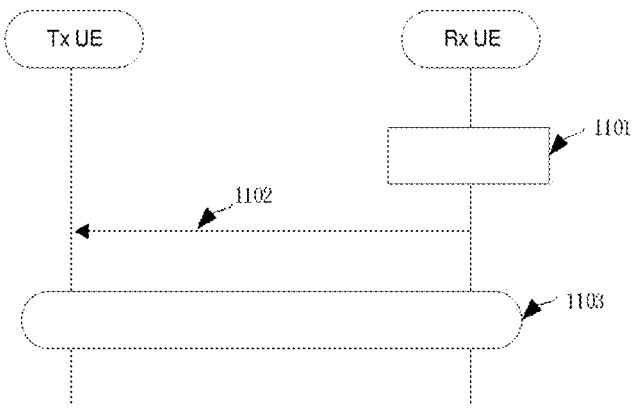
FIG. 11 illustrates an example of initiating a beam reselection procedure according to some embodiments of the present application.

FIG. 11 illustrates an example of initiating a beam reselection procedure according to some embodiments of the present application.

Referring to FIG. 11 at step 1101, the Rx UE may detect an event for a beam reselection procedure. For example, the event may be detected in response to the BFI counter reaching the maximum number as shown in FIG. 10. In response to detecting the event, at step 1102, the Rx UE may transmit an indication to initiate a beam reselection procedure to the Tx UE. At step 1103, a beam reselection procedure may be carried out in between the Tx UE and Rx UE. In an embodiment of the present application, the indication may be transmitted in FR2 as specified in 3GPP standard documents. In an embodiment of the present application, the beam reselection procedure may be performed in FR2 as specified in 3GPP standard documents.

Figure 12:
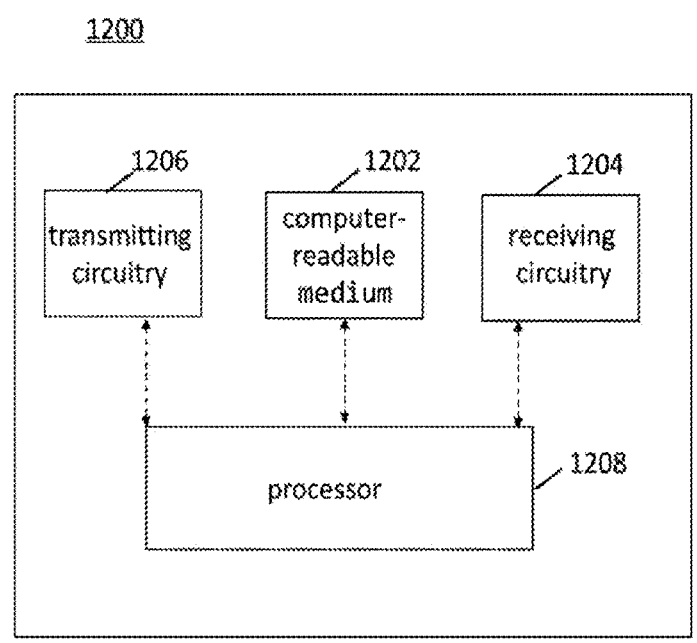
FIG. 12 illustrates a simplified block diagram of an apparatus 1200 for beam failure detection and recovery in sidelink according to some embodiments of the present application.

FIG. 12 illustrates a simplified block diagram of an apparatus 1200 for beam failure detection and recovery in sidelink according to some embodiments of the present application. The apparatus 1200 may be a BS 102 or a UE 101 (e.g., UE 101a or UE 101b) as shown in FIG. 1.

Referring to FIG. 12, the apparatus 1200 may include at least one non-transitory computer-readable medium 1202, at least one receiving circuitry 1204, at least one transmitting circuitry 1206, and at least one processor 1208. In some embodiment of the present application, at least one receiving circuitry 1204 and at least one transmitting circuitry 1206 and be integrated into at least one transceiver. The at least one non-transitory computer-readable medium 1202 may have computer executable instructions stored therein. The at least one processor 1208 may be coupled to the at least one non-transitory computer-readable medium 1202, the at least one receiving circuitry 1204 and the at least one transmitting circuitry 1206. The computer executable instructions can be programmed to implement a method with the at least one receiving circuitry 1204, the at least one transmitting circuitry 1206 and the at least one processor 1208. The method can be a method according to an embodiment of the present application, for example, the method shown in FIG. 3 or FIG. 4.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A user equipment (UE) for wireless communication, comprising:
  at least one memory; and
  at least one processor coupled with the at least one memory and configured to cause the UE to:
  obtain configuration information for a beam failure recovery (BFR) procedure on sidelink, the configuration information indicating a periodic window, a reporting criterion, and a maximum number of a counter indicates unsuccessful receiving of a BFD report,
  wherein the reporting criterion is one of a pseudo periodic reporting and a pseudo-semi-persistent reporting; and
  receive at least one transmission of a beam failure detection reference signal (BFD-RS) on the sidelink within the periodic window according to the configuration information.

2. The UE of claim 1, wherein the configuration information indicates at least one of:
  a timing type of the BFD-RS, the timing type is one of pseudo-periodic or pseudo-semi-persistent;
  a RS type of the BFD-RS, the RS type is one of a synchronization signal and physical broadcast channel (PBCH) block (SSB) or a channel state information (CSI) reference signal (CSI-RS);
  a length of the periodic window;
  a minimum number of transmissions within each window of the periodic window;
  a maximum number of the transmissions within each window of the periodic window; or
  an offset for a first window of the periodic window.

3. The UE of claim 1,
  wherein the reporting criterion is an event triggered reporting.

4. The UE of claim 1,
  the configuration information further indicates at least one of:
  a timing type of a BFD report;
  a periodicity for the BFD report;
  a reporting window for the BFD report; or
  a quantity for the BFD report.

5. The UE of claim 4, wherein the quantity includes at least one of:
  a first indicator indicating whether a beam pair is reliable for sidelink transmission;

a channel quality indicator (CQI);
a rank indication (RI);
a precoding matrix indicator (PMI); or
a reference signal received power (RSRP).

6. The UE of claim 4, wherein the at least one processor is configured to cause the UE to transmit the BFD report in the reporting window based on the configuration information.

7. The UE of claim 4, wherein in response to a non-reliable sidelink transmission indicated by the BFD report, the at least one processor is configured to cause the UE to transmit an indication to initiate a beam reselection procedure.

8. The UE of claim 3, wherein in response to the reporting criterion is the event triggered reporting, the configuration information further indicates at least one of:
a value of a beam failure instance (BFI) timer;
a maximum number of BFI indications; or
a threshold used for the BFI.

9. The UE of claim 8, wherein the at least one processor is configured to cause the UE to:
compare a signal quality of each BFD-RS in a set of BFD-RS associated with each transmission of the BFD-RS to the threshold; and
restart the BFI timer and increase a BFI counter by one responsive to all of the signal qualities of the set of BFD-RS are below the threshold.

10. The UE of claim 9, wherein responsive to the BFI counter reaches the maximum number, the at least one processor is configured to cause the UE to transmit an indication to initiate a beam reselection procedure.

11. An apparatus, comprising:
at least one memory; and
at least one processor coupled with the at least one memory and configured to cause the apparatus to:
obtain configuration information for a beam failure recovery (BFR) procedure on sidelink, the configuration information indicating a periodic window, a reporting criterion, and a maximum number of a counter indicates unsuccessful receiving of a BFD report,
wherein the reporting criterion is one of a pseudo periodic reporting and a pseudo-semi-persistent reporting; and
transmit at least one transmission of a beam failure detection reference signal (BFD-RS) on the sidelink within the periodic window according to the configuration information.

12. The apparatus of claim 11, wherein the configuration information indicates at least one of:
a timing type of the BFD-RS, the timing type is one of pseudo-periodic or pseudo-semi-persistent;
a RS type of the BFD-RS, the RS type is one of a synchronization signal and physical broadcast channel (PBCH) block (SSB) or a channel state information (CSI) reference signal (CSI-RS);
a length of the periodic window;
a minimum number of transmissions within each window of the periodic window;
a maximum number of the transmissions within each window of the periodic window; or
an offset for a first window of the periodic window.

13. The apparatus of claim 11, wherein the at least one processor is configured to cause the apparatus to transmit a medium access control (MAC) control element (CE) message or sidelink control information (SCI) to activate the configuration information.

14. The apparatus of claim 11, wherein the reporting criterion is an event triggered reporting.

15. The apparatus of claim 11, the configuration information further indicates at least one of:
a timing type of a BFD report;
a periodicity for the BFD report;
a reporting window for the BFD report; or
a quantity for the BFD report.

16. The apparatus of claim 15, wherein the quantity includes at least one of:
a first indicator indicating whether a beam pair is reliable for sidelink transmission;
a channel quality indicator (CQI);
a rank indication (RI);
a precoding matrix indicator (PMI); or
a reference signal received power (RSRP).

17. The apparatus of claim 15, wherein the at least one processor is configured to cause the apparatus to receive the BFD report in the reporting window based on the configuration information.

18. The apparatus of claim 15, wherein in response to a non-reliable sidelink transmission indicated by the BFD report, the at least one processor is configured to cause the apparatus to receive an indication to initiate a beam reselection procedure.

19. The apparatus of claim 11, wherein the at least one processor is configured to cause the apparatus to receive an indication to initiate a beam reselection procedure.

20. A base station for wireless communication, comprising:
at least one memory; and
at least one processor coupled with the at least one memory and configured to cause the base station to:
transmit configuration information for a beam failure recovery (BFR) procedure on sidelink, the configuration information indicating a periodic window, a reporting criterion, and a maximum number of a counter indicates unsuccessful receiving of a BFD report,
wherein the reporting criterion is one of a pseudo periodic reporting and a pseudo-semi-persistent reporting,
wherein at least one transmission of a beam failure detection reference signal (BFD-RS) is within the periodic window according to the configuration information; and
the configuration information indicates at least one of:
a timing type of the BFD-RS,
the timing type is one of pseudo-periodic or
pseudo-semi-persistent;
a RS type of the BFD-RS, the RS type is one of a synchronization signal and physical broadcast channel (PBCH) block (SSB) or a channel state information (CSI) reference signal (CSI-RS);
a length of the periodic window;
a minimum number of transmissions within each window of the periodic window;
a maximum number of the transmissions within each window of the periodic window; or
an offset for a first window of the periodic window.

* * * * *